US012675015B2

(12) United States Patent
Bae

(10) Patent No.: US 12,675,015 B2
(45) Date of Patent: Jul. 7, 2026

(54) REFLECTIVE POLARIZING FILM, AND LIGHT SOURCE ASSEMBLY AND LIQUID DISPLAY DEVICE EACH COMPRISING SAME

(71) Applicant: TORAY ADVANCED MATERIALS KOREA INC., Gumi-si (KR)

(72) Inventor: Joong Suk Bae, Gumi-si (KR)

(73) Assignee: TORAY ADVANCED MATERIALS KOREA INC., Gumi-si (KR)

( * ) Notice: Subject to any disclaimer, the term of this patent is extended or adjusted under 35 U.S.C. 154(b) by 321 days.

(21) Appl. No.: 18/699,009

(22) PCT Filed: Sep. 22, 2022

(86) PCT No.: PCT/KR2022/014175
§ 371 (c)(1),
(2) Date: Sep. 26, 2024

(87) PCT Pub. No.: WO2023/058954
PCT Pub. Date: Apr. 13, 2023

(65) Prior Publication Data
US 2025/0020957 A1 Jan. 16, 2025

(30) Foreign Application Priority Data
Oct. 5, 2021 (KR) ........................ 10-2021-0131696

(51) Int. Cl.
*G02F 1/13357* (2006.01)

(52) U.S. Cl.
CPC ................................ *G02F 1/13362* (2013.01)

(58) Field of Classification Search
CPC .............. G02F 1/13362; G02F 1/1335; G02F 1/133528; G02F 1/133536; G02B 1/04; G02B 5/30; G02B 5/3066
See application file for complete search history.

(56) References Cited

U.S. PATENT DOCUMENTS

2014/0043786 A1 2/2014 Cho et al.

FOREIGN PATENT DOCUMENTS

| KR | 10-2008-0005543 | 1/2008 |
| KR | 10-2012-0074257 | 7/2012 |
| KR | 10-2014-0021232 | 2/2014 |
| KR | 10-2014-0021260 | 2/2014 |
| KR | 10-2016-0081603 | 7/2016 |
| KR | 10-2020-0060050 | 5/2020 |
| KR | 10-2020-0060052 | 5/2020 |

OTHER PUBLICATIONS

International Search Report issued in corresponding International Application No. PCT/KR2022/014175, dated Jan. 9, 2023.

*Primary Examiner* — Donald L Raleigh
(74) *Attorney, Agent, or Firm* — NORTON ROSE FULBRIGHT US LLP

(57) ABSTRACT

The present invention relates to a reflective polarizing film, and more specifically to a reflective polarizing film with improved luminance and polarization, and a light source assembly and a liquid crystal display device each including the same.

10 Claims, 10 Drawing Sheets

(a)                    (b)                    (c)

REFLECTIVE POLARIZING FILM, AND LIGHT SOURCE ASSEMBLY AND LIQUID DISPLAY DEVICE EACH COMPRISING SAME

FIELD OF THE DISCLOSURE

The present invention relates to a reflective polarizing film, and more specifically to a reflective polarizing film with improved luminance and polarization, and a light source assembly and a liquid crystal display device each including the same.

DESCRIPTION OF RELATED ART

Flat panel display technology is dominated by liquid crystal display (LCD), projection display and plasma display (PDP), which have already secured a market in the TV field, and additionally, field emission displays (FED) and electroluminescent displays (ELD) are expected to occupy the fields according to their respective characteristics along with improvements in the related technologies. The usage range of liquid crystal displays is currently being expanded to laptops, personal computer monitors, LCD TVs, automobiles, airplanes and the like, and they account for about 80% of the flat panel market, and the demand for LCDs has rapidly increased worldwide and is currently enjoying a boom.

A conventional liquid crystal display arranges a liquid crystal and an electrode matrix between a pair of light-absorbing optical films. In a liquid crystal display, the liquid crystal part has an optical state that is changed by moving the liquid crystal part by an electric field generated by applying a voltage to two electrodes. This process displays an image by using polarized light in a specific direction as information-loaded 'pixels.' For this reason, liquid crystal displays include a front optical film and a rear optical film for inducing polarization.

An optical film used in such a liquid crystal display does not necessarily have a high utilization efficiency of light that is emitted from a backlight. This is because 50% or more of the light emitted from the backlight is absorbed by the rear-side optical film (absorptive polarizing film). Therefore, in order to increase the efficiency of backlight usage in a liquid crystal display, a reflective polarizer is installed between the optical cavity and the liquid crystal assembly.

FIG. 1 is a diagram illustrating the optical principle of a reflective polarizer. Specifically, among the light heading from the optical cavity to the liquid crystal assembly, the P-polarized light passes through the reflective polarizer and is transmitted to the liquid crystal assembly, and the S-polarized light is reflected from the reflective polarizer to the optical cavity, and then, by repeating a cycle in which the polarization direction of light is reflected in a randomized state on the diffuse reflection surface of the optical cavity and then transmitted back to the reflective polarizer, eventually, the S-polarized light is converted into the P-polarized light that can pass through the polarizer of the liquid crystal assembly, and after passing through the reflective polarizer, it is then transmitted to the liquid crystal assembly.

In the case of a reflective polarizer that exhibits the above functions, examples thereof include a multilayer reflective polarizer in which a flat optical layer having an optically anisotropic refractive index and a flat optical layer having an optically isotropic refractive index are alternately stacked, a cholesteric liquid crystal reflective polarizer including a helical cholesteric liquid crystal in a specific direction, a polymer-dispersed reflective polarizer including a discontinuous phase having an optically anisotropic or optically isotropic refractive index inside a continuous phase having an optically isotropic or optically anisotropic refractive index, an island-in-the-sea yarn distributed reflective polarizer including a birefringent island-in-the-sea yarn inside an isotropic base layer, a wire-grid type reflective polarizer and the like.

As an example of the polymer-dispersed reflective polarizer, the reflective polarizer in which a dispersion is dispersed that can achieve the function of a reflective polarizer by arranging a birefringent polymer elongated in the longitudinal direction inside a base layer has been proposed, and recently, many efforts are being made to control the size of a dispersed birefringent polymer to improve luminance and the degree of polarization.

However, the polymer-dispersed reflective polarizer which has been developed so far has a problem in that the luminance difference is large and the degree of polarization is not good compared to the multilayer reflective polarizer.

SUMMARY

The present invention has been devised to solve the above-described problems, and an object of the present invention is to provide a reflective polarizing film which exhibits luminance characteristics close to those of a multilayer reflective polarizer by improving the luminance of a conventional polymer-dispersed reflective polarizer.

In addition, another object of the present invention is to provide a reflective polarizing film which is capable of improving polarization characteristics along with the improvement of luminance characteristics.

In addition, still another object of the present invention is to provide a light source assembly and a liquid crystal display in which the degree of polarization of emitted light is improved and luminance is improved by employing the reflective polarizing film according to the present invention.

In order to solve the above-described problems, the present invention provides a reflective polarizing film, including: a matrix; and a core layer including a plurality of polymer dispersions that are randomly arranged in the matrix in the y-axis and z-axis directions while the x-axis direction is the longitudinal direction among the x-axis, y-axis, and z-axis that are perpendicular to one another, wherein when a plane of the core layer taken along a y-z plane is demarcated into 5 regions with the same thickness in the z-axis direction, the difference between a polymer dispersion area percentage in the uppermost or the lowermost region and a polymer dispersion area percentage in the center region among the 5 regions is 10% or less According to an exemplary embodiment of the present invention, the matrix and the polymer dispersion may have a difference in refractive index in the y-axis and z-axis directions of 0.05 or less, and a difference in refractive index in the x-axis direction of 0.1 or more.

In addition, the plurality of polymer dispersions may have an average thickness of 30 nm or more, and more preferably, 50 nm or more, on a plane of the core layer taken along the y-z plane.

In addition, the polymer dispersion located in the center region may have an average thickness of 110 nm or less.

In addition, the average thickness ratio $(d_{II}/d_I)$ between the average thickness $(d_I)$ of the polymer dispersion included in the uppermost region or the lowermost region and the average thickness $(d_{II})$ of the polymer dispersion included in the center region may be 0.8 to 1.6.

In addition, the percentage of the polymer dispersion area in the total area of the matrix and polymer dispersion in the uppermost region or the lowermost region and the percentage of the polymer dispersion area in the total area of the matrix and polymer dispersion in the center region may be each independently 40 to 55%.

In addition, the reflective polarizing film may have a haze of 30% or less, and the core layer may have a thickness of 150 μm or less.

In addition, the reflective polarizing film may further include a skin layer which is formed integrally with at least one surface of the core layer.

In addition, the present invention provides a light source assembly, including the reflective polarizing film according to the present invention.

In addition, the present invention provides a liquid display device, including: a light source unit which is the light source assembly according to the present invention; and a display unit including a liquid crystal cell which is disposed on a light-emitting surface of the light source unit.

Since the reflective polarizing film of the present invention has greatly improved luminance and improved polarization, it can be widely used as a part of a liquid crystal display device such as a light source assembly, and additionally, it can be applied to glass windows and various polarized lighting industries in general.

BRIEF DESCRIPTION OF THE DRAWINGS

FIGS. 7a to 7c are cross-sectional mimetic diagrams of a central part of the cross-sections of reflective polarizing film core layers according to the examples and comparative examples of the present invention, wherein FIG. 7a is a cross-sectional mimetic diagram of Region C of the reflective polarizing film core layer of Example 1, and FIGS. 7b and 7c are cross-sectional mimetic diagrams of Region C of the core layers of the reflective polarizing films of Example 2 and Comparative Example 1, respectively.

DETAILED DESCRIPTION OF THE INVENTION

Figures 5A, 5B:
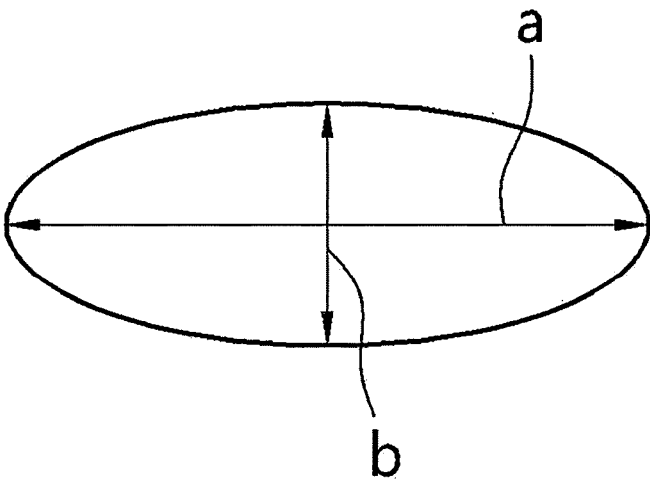
FIGS. 5a to 5c are mimetic diagrams exemplified for defining the aspect ratio, thickness and width of the polymer dispersion provided in a core layer in the reflective polarizing film according to an exemplary embodiment of the present invention.
Figure 5C:
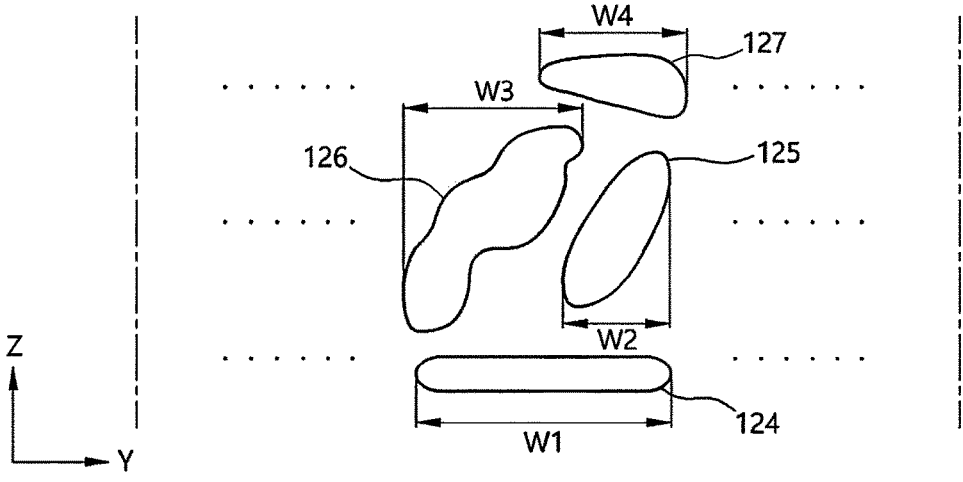

Hereinafter, with reference to the accompanying drawings, the exemplary embodiments of the present invention will be described in detail so that those skilled in the art can easily practice the present invention. The present invention may be embodied in many different forms and is not limited to the exemplary embodiments set forth herein. In order to clearly describe the present invention in the drawings, parts that are irrelevant to the description are omitted, and the same reference numerals are assigned to the same or similar components throughout the specification. In addition, the present invention is not limited by the size and/or shape of one component illustrated in the drawings. For example, the number and size of a plurality of polymer dispersions illustrated in FIGS. 2 and 3, the spacing between the dispersions, the number and distribution of the dispersions per region, and the shape of the polymer dispersions illustrated in FIGS. 5b and 5c are only examples for explaining the present invention, and are not illustrated to exactly match the reflective polarizing film according to the present invention. In addition, the dotted line illustrated on one side of FIG. 3 only roughly describes the longitudinal direction of the polymer dispersion, and does not mean the length of the polymer dispersion inside the matrix, which is not illustrated.

Figure 1:
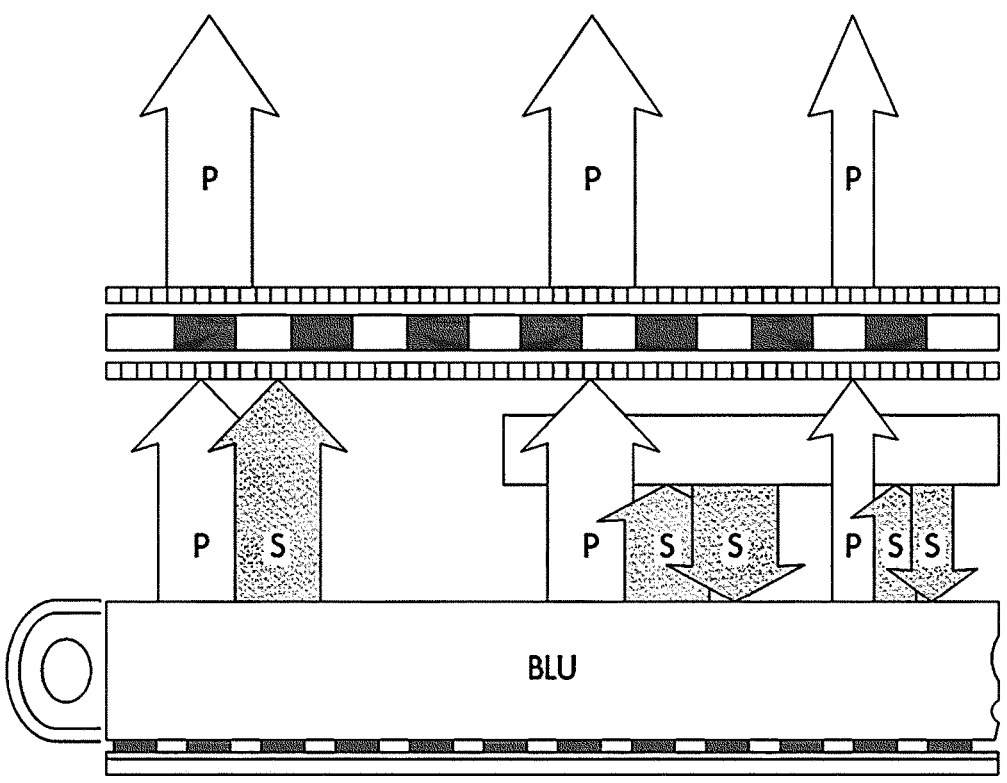
FIG. 1 is a schematic diagram illustrating the principle of a reflective polarizer.
Figure 2:
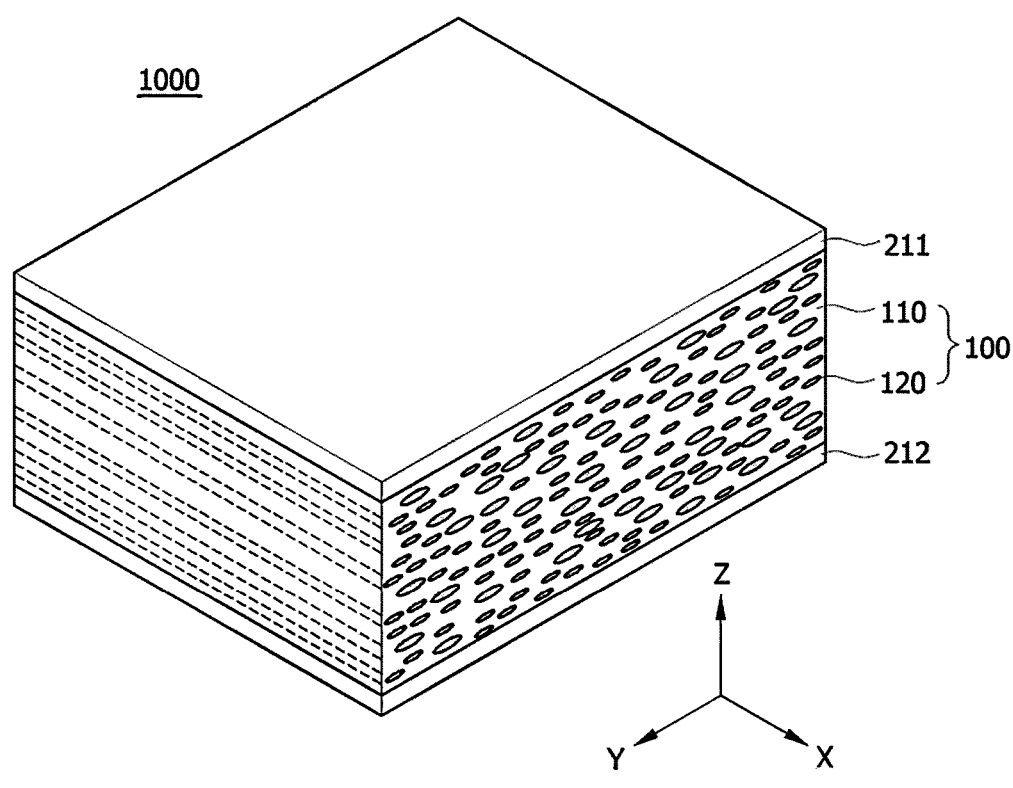
FIGS. 2 and 3 are cross-sectional and cross-sectional enlarged diagrams of a reflective polarizing film according to an exemplary embodiment of the present invention.
Figures 3, 4:
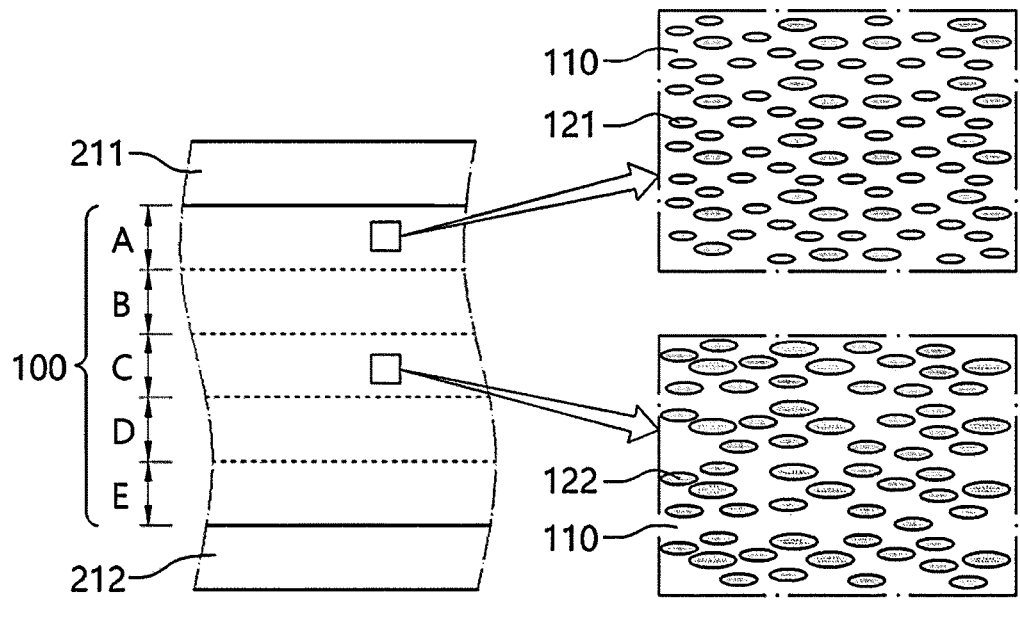
FIG. 4 is a mimetic diagram illustrating the longitudinal direction arrangement of a polymer dispersion provided in a core layer in the reflective polarizing film according to an exemplary embodiment of the present invention.

Referring to FIGS. 2 to 3, the reflective polarizing film 1000 according to an exemplary embodiment of the present invention includes a matrix 110 and a core layer 100 including a plurality of polymer dispersions 120 that are randomly located inside the matrix 110.

According to an exemplary embodiment of the present invention, a birefringent interface may be formed between the matrix 110 and the polymer dispersion 120 included in the matrix. Specifically, the amount of substantial match or mismatch in the refractive indices along the X, Y and Z axes in space between the matrix 110 and the polymer dispersion 120 affects the degree of scattering of polarized light along those axes. In general, the scattering power changes in proportion to the square of the refractive index mismatch. Accordingly, as the degree of mismatch of the refractive indices along a particular axis is greater, the light rays that are polarized along that axis become greatly scattered. Conversely, if the mismatch along a particular axis is small, light rays that are polarized along that axis are scattered to a lesser degree. When the refractive index of the matrix 110 along some axis substantially matches the refractive index of the polymer dispersion 120, incident light that is polarized with an electric field parallel to this axis will not be scattered regardless of the size, shape and density of the parts of the dispersion, but will pass through the dispersion. In addition, when the refractive indices along their axes substantially match, the light rays pass through the object without being substantially scattered. More specifically, the first polarized light (P-polarized light) is transmitted without being affected by the birefringent interface formed at the boundary between the matrix 110 and the polymer dispersion 120, but the second polarized light (S-polarized light) is affected by the birefringent interface formed at the boundary between the matrix 110 and the polymer dispersion 120, resulting in light modulation. Through this, the P-polarized light is transmitted, and the S-polarized light undergoes the modulation of light such as light scattering and reflection, and finally, the separation of polarized light occurs.

Therefore, since the matrix 110 and the polymer dispersion 120 must form a birefringent interface to induce the light modulation effect, when the matrix 110 is optically isotropic, the polymer dispersion 120 may have birefringence. Conversely, when the matrix 110 has optical birefringence, the polymer dispersion 120 may have optical isotropy. Specifically, when the refractive index of the polymer dispersion 120 in the x-axis direction is nX1, the refractive index in the y-axis direction is nY1, and the refractive index in the z-axis direction is nZ1, and the refractive indices of the matrix 110 are nX2, nY2 and nZ2, in-plane birefringence between nX1 and nY1 may occur. More preferably, at least any one of the X, Y and Z-axis refractive indices of the matrix 110 and the polymer dispersion 120 may be different, and more preferably, when the stretching axis is the X-axis, the difference in refractive indices with respect to the Y-axis and Z-axis directions may be 0.05 or less, and the difference in refractive indices with respect to the X-axis may be 0.1 or more. Meanwhile, conventionally, if the difference in refractive indices is less than 0.05, it is interpreted as matching.

The matrix 110 may be used without limitation if it is a material of a substrate layer used in a conventional polymer-dispersed reflective polarizer, and preferably, polyethylene naphthalate (PEN), co-polyethylene naphthalate (co-PEN), polyethylene terephthalate (PET), polycarbonate (PC), polycarbonate (PC) alloy, polystyrene (PS), heat-resistant polystyrene (PS), polymethyl methacrylate (PMMA), polybutylene terephthalate (PBT), polypropylene (PP), polyethylene (PE), acrylonitrile butadiene styrene (ABS), polyurethane (PU), polyimide (PI), polyvinyl chloride (PVC), styrene acrylonitrile blend (SAN), ethylene vinyl acetate (EVA), polyamide (PA), polyacetal (POM), phenol, epoxy (EP), urea (UF), melanin (MF), unsaturated polyester (UP), silicone (SI) and cycloolefin polymers may be used, and for example, it may be a polycarbonate (PC) alloy.

In addition, if the polymer dispersion 120 is also a dispersion material used in a conventional polymer dispersion type reflective polarizer, it may be used without limitation, and preferably, polyethylene naphthalate (PEN), co-polyethylene naphthalate (co-PEN), polyethylene terephthalate (PET), polycarbonate (PC), polycarbonate (PC) alloy, polystyrene (PS), heat-resistant polystyrene (PS), polymethyl methacrylate (PMMA), polybutylene terephthalate (PBT), polypropylene (PP), polyethylene (PE), acrylonitrile butadiene styrene (ABS), polyurethane (PU), polyimide (PI), polyvinyl chloride (PVC), styrene acrylonitrile blend (SAN), ethylene vinyl acetate (EVA), polyamide (PA), polyacetal (POM), phenol, epoxy (EP), urea (UF), melanin (MF), unsaturated polyester (UP), silicone (SI) and cycloolefin polymer may be used alone or in combination, and for example, it may be PEN.

In addition, the plurality of polymer dispersions 120 may have a rod-like or fibrous shape elongated in one direction. Accordingly, the plurality of polymer dispersions 120 may have an aspect ratio, which is the ratio between the length of the main axis in the longitudinal direction of the dispersion 120 and the length of the transverse axis of the cross-section perpendicular to the main axis, of greater than 10, and in other examples, it may be greater than 100, greater than 1,000, greater than 10,000, or greater than 100,000. The transverse axis length means the diameter of a circle when the shape of the cross-section is circular, and it means the length of a line segment having the largest length among two line segments connecting the periphery when the cross-section is not a circle. In addition, as illustrated in FIG. 5*a*, the cross-sectional aspect ratio, which is the ratio (a/b) of the major axis length (a) to the minor axis length (b) in the cross-section of the polymer dispersion 120 based on a cut plane which is the y-z plane of the core layer 100, may also be more than 1, and in another examples, it may be more than 2. Herein, the minor axis length (b) means the length of a minor axis when the axis perpendicularly bisecting the major axis is referred to as the minor axis. In addition, the cross-sectional aspect ratio may be 10 or less, and if the cross-sectional aspect ratio is more than 10, there is a concern that luminance may decrease due to light scattering, haze increase and the like.

In addition, the plurality of polymer dispersions 120 are arranged in the matrix 110 such that the x-axis direction among three mutually perpendicular x-, y- and z-axes become a longitudinal direction. However, herein, being arranged such that the x-axis direction becomes the longitudinal direction does not mean that the longitudinal direction of all the polymer dispersions 120 are arranged to be parallel to the x-axis, as schematically illustrated in FIG. 2, but it means that the direction of the main axis, which is the longitudinal direction of the polymer dispersion 120, is closer to the x-axis direction than the y-axis and z-axis.

In this regard, when it is specifically described with reference to FIG. 4, in the x-z plane of the core layer 100, the first polymer dispersion 123 is arranged such that the longitudinal direction is parallel to the x-axis direction, but the second polymer dispersion 121 and the third polymer dispersion 122 may be arranged such that the longitudinal direction is tilted at a predetermined angle in the z-axis direction. In addition, although not illustrated in FIG. 4, it should be noted that the polymer dispersion may be arranged to be inclined at a predetermined angle even in the y-axis direction. However, herein, the predetermined angle is, for example, less than (±)45°, less than (±)35°, less than (±)25°, less than (±)15°, less than (±)10°, less than (±)5°, less than (±)3°, or less than (±)1°.

In addition, the plurality of polymer dispersions 120 are randomly arranged along the y-axis and z-axis directions. That is, in the cross-section of the core layer 100 in the y-axis and z-axis directions, the plurality of polymer dispersions 120 are randomly arranged regardless of the size and shape of the cross-section of the polymer dispersion.

Additionally, in the reflective polarizing film 1000 according to the present invention, when a plane of the core layer taken along a y-z plane is demarcated into 5 regions (A, B, C, D, E) with the same thickness in the z-axis direction, the difference between a polymer dispersion 121 area percentage in the uppermost region (A) or the lowermost region (E) and a polymer dispersion area percentage in the center region among the 5 regions may be 10% or less, preferably, 5% or less, more preferably, 3% or less, and even more preferably 2% or less.

While the inventor of the present invention continued to research why the luminance characteristics of the polymer-dispersed reflective polarizer are inferior to the multilayer reflective polarizer in which the optically isotropic layer and the optically anisotropic layer are alternately stacked, it was discovered that in the y-z plane of the implemented polymer-dispersed reflective polarizer, the size of the polymer dispersion was not uniform depending on the position in the z-axis direction, and particularly, whereas the polymer dispersion located in the center with respect to the z-axis direction in the y-z plane had a thinner thickness and a relatively wider width than the polymer dispersion located in the side part with respect to the z-axis direction in the y-z plane, the spacing between adjacent polymer dispersions was also implemented to be narrowed. Accordingly, as a result of performing research focused on the idea that differences in morphology between polymer dispersions and differences in spacing between dispersions depending on the position with respect to the z-axis direction in the y-z plane will affect luminance and polarization characteristics, when the difference between the area percentage of the polymer dispersion 121 in the uppermost region (A) or the lowermost region (E) and the area percentage of the polymer dispersion 122 in the center region (C) for each z-axis direction region of the core layer are implemented to satisfy 10% or less, it was discovered that luminance and the degree of polarization were greatly improved compared to the related art, thereby leading to the present invention.

Figure 6:
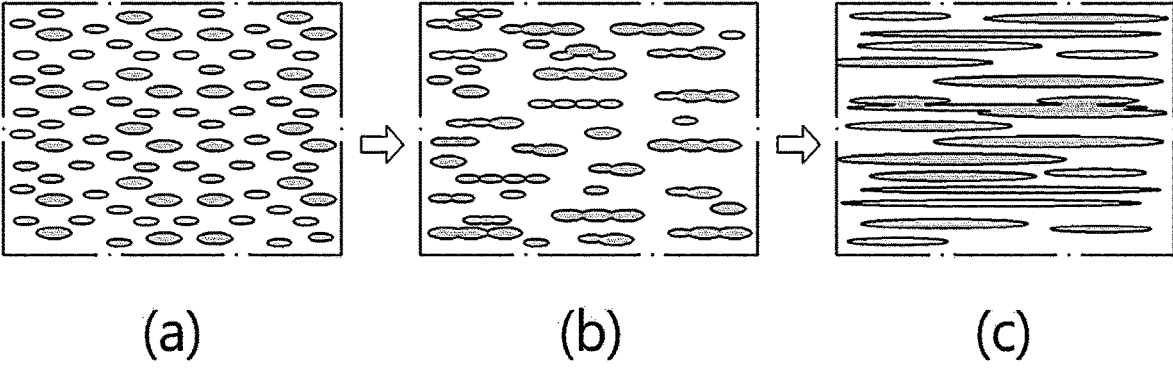
FIG. 6 is a mimetic diagram illustrating the fusion of the dispersions and the interface destruction between the dispersion and the matrix that may occur during the manufacturing process of a reflective polarizing film, and it is a diagram in which after the dispersion-forming component in the matrix-forming component was dispersed (FIG. 6(a)), fusion between the dispersion-forming components (FIG. 6(b)), fusion of the dispersion-forming components and the interface destruction between the dispersion-forming components/matrix-forming components occurred.

Specifically, various factors may be involved in the reason for the difference in morphology between the polymer dispersions and the difference in spacing between the dispersions depending on the position with respect to the z-axis direction in the y-z plane of the core layer 100, but for example, in the process of extruding the molten polymer dispersion-forming component and matrix-forming component together and then being cooled in the manufacturing process, depending on the differences in cooling rate, cooling method and the like between the uppermost region (A) corresponding to the surface part in the thickness direction and/or the lowermost region (E) and the center region (C), it was discovered that the morphology and inter-dispersion spacing of the polymer dispersions distributed in the center region (C) were significantly different compared to the polymer dispersions in the uppermost region (A) and/or the lowermost region (E). In particular, as illustrated in FIG. 6, even if the dispersion state of the polymer dispersion-forming component is good regardless of the position in the z-axis direction immediately after extrusion (refer to FIG. 6(a)), the center region (C) is not cooled properly such that when the solidification rate is slow, bonding occurs between adjacent polymer dispersion-forming components (refer to FIG. 6(b)), and when it is more severe, as the polymer dispersion-forming components that are combined to form one large lump spread and solidify in the direction parallel to the x-y plane, it was discovered that a polymer dispersion having a thin and widely spread shape was formed rather compared to the thickness of the polymer dispersion 121 located in the uppermost region (A) which is the surface part and/or the lowermost region (E). In addition, when the solidification of the polymer dispersion-forming component is delayed, the matrix-forming component is changed into a third material by a chemical reaction occurring at the interface between the polymer dispersion-forming component and the matrix-forming component, and therefore, it was found that the proportion of the intact matrix decreases. In this way, when the cooling of the central part is not properly performed, the matrix weight ratio decreases due to the bonding between the polymer dispersion-forming components and as the matrix-forming component is changed to a third material in the central part of the cross-section of the core layer. As such, ultimately, the area ratio of the polymer dispersion to the total area of the polymer dispersion and matrix in the cross-section increases, and the polymer dispersion may have a laterally thin and spread shape (refer to FIG. 6(c)).

After all, improper cooling of the central part in the thickness direction after extrusion may be one of the causes of structural and chemical transformation of the polymer dispersion and matrix that are distributed in the central part as described above, and when the reflective polarizing film is implemented by controlling the factors inducing structural and chemical transformation, the difference in the area percentage between the polymer dispersion 121 located in the uppermost region (A) or lowermost region (E) and the polymer dispersion located in the center region (C) for each z-axis direction region of the core layer may be implemented to be 10% or less, and such a reflective polarizing film may exhibit excellent effects in luminance and polarization characteristics. The fact that the difference in the area percentages of the polymer dispersions between regions is more than 10% means that in other words, the matrix material in the region is modified into a third material, and the third material is identified as a polymer dispersion and is the result of being added to the area of the polymer dispersion, and/or the degree or frequency of coalescence between the polymer dispersions may be high, and the luminance and polarization characteristics of the reflective polarizing film may be significantly deteriorated in terms of physical properties.

Herein, the area percentage of the polymer dispersion located in a specific region is the percentage of the area of the polymer dispersion based on the total area of the matrix and polymer dispersion in the specific region, and the total area of the matrix and polymer dispersion within a specific region and the area of the polymer dispersion are calculated as a result of calculating the area percentage of the polymer dispersion by using Image-J, which is an open program on the Internet, for SEM images photographed for a specific region. In this case, it should be noted that the area percentage of the polymer dispersion in the Image J program is calculated based on the SEM images that are corrected for contrast, magnification and the like such that the interface between the polymer dispersion and the matrix can be clarified in the captured SEM images.

Additionally, in the y-z cross-section of the core layer 100, the percentage of the area of the polymer dispersion based on the total area of the matrix and the polymer dispersion in the center region (C) and the uppermost region (A) or the lowermost region (E) may satisfy 40 to 55%, and more preferably, 45 to 50%, and through this, it prevents modification into a third material due to a chemical reaction at the interface between the matrix component and the polymer dispersion located in the center region, and as the gap between adjacent polymer dispersions is implemented to be not narrow, it may be advantageous to achieve desired luminance and polarization characteristics. If the percentage of the area of the polymer dispersion based on the total area of the matrix and the polymer dispersion is less than 40% or more than 55%, any one or both of the luminance and polarization characteristics may be significantly deteriorated. In particular, the fact that the percentage of the area of the polymer dispersion is more than 55% means that in other words, it is modified into a third material due to a chemical reaction at the interface between the polymer dispersion and the matrix, and the third material is identified as a polymer dispersion such that it may be a result of addition to the area of the polymer dispersion and/or may be a case where coalescence between polymer dispersions occurs.

In addition, according to an exemplary embodiment of the present invention, the average thickness of the polymer dispersion located in the uppermost region (A) or lowermost region (E) for each z-axis direction region of the core layer 100 may be 100 nm or less, and more preferably, the polymer dispersion located in the uppermost region (A) or the lowermost region (E) may have an average thickness of 80 nm or less. In addition, preferably, the average thickness may be 30 nm or more, and more preferably, 50 nm or more. Light transmitted through the lower part of the reflective polarizing film 1000 undergoes light modulation such as reflection and transmission at the interface between the matrix 110 and the plurality of polymer dispersions 120, and since constructive interference and destructive interference occur between reflected and transmitted lights with different optical paths, some of the light may be emitted through the upper part of the reflective polarizing film 1000, some of the light may be lost through destructive interference, and the rest may be emitted from the lower surface or side surface of the reflective polarizing film 1000. Therefore, it is difficult for light that is incident from below the reflective polarizing film 1000 to be emitted 100% upward, and as a result, the degree of polarization and luminance may be reduced. Since the average thickness of the polymer dispersion 121 located in the uppermost region (A) or the lowermost region (E) satisfies 100 nm or less, it is advantageous to prevent deterioration in the degree of polarization and luminance. If the average thickness of the polymer dispersion located in the uppermost region (A) or the lowermost region (E) is more than 100 nm, there is a concern that any one or more physical properties of polarization and luminance may be deteriorated, and particularly, there is a concern that the polarization characteristics are significantly deteriorated. Herein, when looking at the cross-section of the polymer dispersion from the cut plane of the core layer 100 which is the y-z plane, the thickness of the dispersion refers to the length of the longest line segment among the line segments connecting the circumference of the cross-section of the polymer dispersion to be parallel to the z-axis direction corresponding to the thickness direction of the core layer 100, and the average thickness of the polymer dispersion refers to the average value of the thicknesses of these polymer dispersions. When these are explained with reference to FIG. 5$b$, the thickness of the first polymer dispersion 124 is $d_1$, the thickness of the second polymer dispersion 125 is $d_2$, the thickness of the third polymer dispersion 126 is $d_3$, and the thickness of the fourth polymer dispersion 127 is $d_4$.

In addition, the average thickness of the polymer dispersion 122 located in the center region (C) of the core layer 100 may be preferably 110 nm or less, more preferably, 90 nm or less, and even more preferably, 80 nm or less. In addition, preferably, the thickness may be 30 nm or more, and more preferably, 50 nm or more, and through this, it may be advantageous to achieve luminance and polarization characteristics at desired levels.

Meanwhile, since the appropriate solidification of the center region (C) of the core layer 100 properly implements the thickness ratios of the polymer dispersions located in the uppermost region (A) or lowermost region (E) and the center region of the core layer 100, respectively, it may be advantageous to exhibit more increased luminance and polarization characteristics. Specifically, the thickness ratio $(d_{II}/d_I)$ between the average thickness $(d_I)$ of the polymer dispersion included in the uppermost region or the lowermost region and the average thickness $(d_{II})$ of the polymer dispersion included in the center region may satisfy 0.8 to 1.6, and more preferably, the thickness ratio $(d_{II}/d_1)$ may satisfy 0.8 to 1.1. If the thickness ratio $(d_{II}/d_I)$ does not satisfy the above-described range, it may be difficult to achieve increased luminance and polarization characteristics simultaneously, and specifically, if the thickness ratio $(d_{II}/d_I)$ of the polymer dispersions is less than 0.8, it may be difficult to achieve increased luminance characteristics, and particularly, the extend of decrease of the degree of polarization may increase. In addition, even if the thickness ratio $(d_{II}/d_I)$ is more than 1.6, there is a concern that the degree of polarization and luminance may significantly deteriorate.

In addition, according to an exemplary embodiment of the present invention, as illustrated in FIG. 5$c$, the ratio of the polymer dispersions 120 that have widths ($W_1$, $W_2$, $W_3$, $W_4$) of 20 nm or less, and preferably, 150 nm or less, based on the cut plane of the core layer 100 which is the y-z plane may be, for example, 50% or more, and in other examples, 60% or more, 70% or more, 80% or more, 85% or more, 90% or more, 95% or more, 98% or more or 99% or more, based on the total number of the polymer dispersions, and through this, it is possible to minimize the light loss of transmitted light transmitted through the core layer 100 in the z-axis direction so as to prevent a decrease in luminance. Herein, the widths of the polymer dispersion 120 mean the widths ($W_1$, $W_2$, $W_3$, $W_4$) projected on the two-dimensional surface when the polymer dispersion 120 is viewed in the z-axis direction, and it should be noted that it is distinguished from the major axis length of the polymer dispersion in the cut plane of the core layer 100 which is the y-z plane. As the width of the polymer dispersion 120 increases and/or the ratio of the polymer dispersion having a large width increases, there is a possibility that the average thickness of the polymer dispersion 120 decreases or the gap between adjacent polymer dispersions becomes narrow, and in this case, there is a concern that the degree of polarization and luminance are remarkably deteriorated.

Meanwhile, the reflective polarizing film 1000 according to an exemplary embodiment of the present invention may further include skin layers 211, 212 that are disposed on both surfaces of the core layer 100 as illustrated in FIGS. 2 and 3. The skin layers 211, 212 serve to supplement the mechanical strength of the core layer 100 and protect the core layer 100 from external factors. In this case, a separate adhesive layer may be further provided between the core layer 100 and the skin layers 211, 212, but preferably, the skin layers 211, 212 may be co-extruded together with the core layer 100 without a separate adhesive layer to be integrally formed. As a result, it is possible to prevent the deterioration of optical properties due to the adhesive layer and to implement a thinner optical film.

Furthermore, unlike the case where the conventional optical layer is stretched and then adhered to the unstretched skin layer, the skin layers 211, 212 included in an exemplary embodiment of the present invention are simultaneously co-extruded with the core layer 100, and then, a stretching process is performed, and thus, it may be stretched in at least one axial direction. Through this, the surface hardness is improved compared to the unstretched skin layer such that scratch resistance and heat resistance may be improved.

The skin layers 211, 212 may have a skin layer material that is commonly used to perform the support function of the reflective polarizing film, and preferably, polyethylene naphthalate (PEN), co-polyethylene naphthalate (co-PEN), polyethylene terephthalate (PET), polycarbonate (PC), polycarbonate (PC) alloy, polystyrene (PS), heat-resistant polystyrene (PS), polymethyl methacrylate (PMMA), polybutylene terephthalate (PBT), polypropylene (PP), polyethylene (PE), acrylonitrile butadiene styrene (ABS), polyurethane (PU), polyimide (PI), polyvinyl chloride (PVC), styrene acrylonitrile blend (SAN), ethylene acetic acid vinyl (EVA), polyamide (PA), polyacetal (POM), phenol, epoxy (EP), urea (UF), melanin (MF), unsaturated polyester (UP), silicone (SI) and cycloolefin polymers may be used alone or in combination, and more preferably, the same materials as the components of the matrix 110 described above may be used.

In the above-described reflective polarizing film 1000, the thickness of the core layer 100 may be 20 to 150 μm, and more preferably, 50 to 120 μm, and the thickness of the skin layers 211, 212 may be 50 to 500 μm, but the present invention is not limited thereto. In addition, the number of polymer dispersions 120 on the surface of the core layer 100 cut in the y-z plane may be 100 to 3,000 in a unit area of 5 μm×5 μm in width and length, but the present invention is not limited thereto.

In addition, the reflective polarizing film 1000 may have a haze of 30% or less. If the haze is more than 30%, it may be difficult to achieve the objects of the present invention because luminance is lowered.

Hereinafter, the method for manufacturing the reflective polarizing film 1000 described above will be described. The reflective polarizing film 1000 according to an exemplary embodiment of the present invention may be manufactured by passing through the steps of supplying a matrix component and a polymer dispersion component to an extrusion unit, inducing spreading in a flow control unit such that the polymer dispersion component included within the matrix can be randomly arranged, cooling and smoothing, stretching a film that has been cooled and smoothed, and heat-setting the stretched film.

First of all, the step of supplying a matrix component and a polymer dispersion component to an extrusion unit may be performed as step (1). Each of these components may be first mixed and then supplied to a single extrusion unit or each component may be individually supplied to independent extrusion units, and in this case, two or more extrusion units may be configured. However, preferably, each of these components may be mixed through sufficient stirring before being supplied to the extrusion unit and then supplied to a single extrusion unit, and through this, it may be advantageous to uniformly implement the thickness of the polymer dispersion located in the above-described uppermost or lowermost region of the core layer 100 at the level desired by the present invention. In this case, the extrusion unit may be an extruder, which may further include a heating means to convert the supplied polymer components in a solid phase into a liquid phase.

Meanwhile, in order to arrange the polymer dispersion component inside the matrix component, it is preferable that there is a difference in flowability between the matrix component and the polymer dispersion component, and to this end, it is better to design such that there is a difference in viscosity between the two components, and preferably, it is better to design the flowability of the matrix component to be better than that of the polymer dispersion component. The matrix component and the polymer dispersion component may be randomly arranged through the viscosity difference of the polymer dispersion component in the matrix component while passing through a mixing zone and a mesh filter zone.

The above-described thickness size control and uniform dispersion of the polymer dispersion may be achieved primarily through the process control of step (1), and specifically, before each component is introduced into the extrusion unit, depending on whether the two components are introduced into the extrusion unit while being mixed through sufficient stirring and by changing the discharge amount during extrusion, the extruder rotation speed involved in sheer stress and the type of extruder (single, coaxial twin, etc.), it may be advantageous to control the thickness size or dispersibility of the polymer dispersion.

Meanwhile, the skin layer constitutes an upper layer and a lower layer through a separate extruder, but each extruder may be used, and in the case of using one extruder, through a flow path, a three-layer structure of S/M/S may be formed by constituting layers with the upper layer(S) and the lower layer(S) with a core layer (M) at the center, and the three-layer structure formed in a molten state may be discharged through T-DIE and solidified on a cooling roll, thereby forming a skin layer without a separate adhesive. In addition, the material of the skin layer may be the same or different, but it is preferably the same as the material used as the matrix, and the thickness of the skin layer is preferably designed to maximize optical properties.

Next, as step (2) of the present invention, a flow control unit may induce spreading such that the polymer dispersion components located inside the matrix can be randomly arranged. The flow control unit may use a known flow control unit, and for example, a coat-hanger die may be used. Through the induction of spreading through the flow control unit in step (2), it is possible to further control the thickness or dispersibility of the polymer dispersion secondarily.

Next, the step of cooling and smoothing may be performed as step (3) of the present invention. As a step of cooling and smoothing a film transferred from the flow control unit, it may be cooled and solidified under the conditions used in the manufacture of a typical reflective polarizing film, and then, a smoothing step may be adopted and modified to be performed, and for example, a cooling and smoothing process may be performed on a casting roll process. Preferably, one surface of the film transferred through the flow control unit is brought into contact with the main cooling roll to be cooled, and in this case, the main cooling roll temperature may be set to 40° C. or less, more preferably, 35° C. or less, and in another example, 20° C. or less to perform cooling. If the temperature of the main cooling roll is more than 40° C., the bonding between the polymer dispersion-forming components dispersed in a molten state in the matrix component in the above-described center region among the regions equally demarcated into 5 regions in the z-axis direction of the core layer 100 is likely to occur, and as a result, the thickness of the solidified polymer dispersion may become thick, or the polymer dispersion of the combined mass may spread in the left-right direction such that the thickness can become thinner. In addition, the area percentage of the polymer dispersion may be greatly increased as the proportion of the matrix modified with a third material increases due to a chemical reaction at the interface between the polymer dispersion and the matrix. In addition, more preferably, the opposite surface which is not in contact with the cooling roll is cooled together through an auxiliary cooling means, and the auxiliary cooling means may be, for example, cooling air, and more preferably, the temperature of the cooling air may be 30° C. or less, and more preferably, 20° C. or less.

Next, the step of smoothing and stretching the cooled film may be performed as step (4) of the present invention. In order to prevent problems such as breakage due to thickness deviation during stretching, the stretching process applied to the conventional reflective polarizing film may be adopted and modified for the film subjected to the smoothing process, and through this, it may cause a difference in refractive index between the matrix component and the polymer dispersion component, thereby causing light modulation at the interface. The stretching may be performed by uniaxial stretching or biaxial stretching, and more preferably, uniaxial stretching may be performed. In the case of uniaxial stretching, the stretching direction may be, for example, the x-axis direction. In addition, the stretching ratio may be 3 to 12 times.

Next, the step of heat-setting the stretched film may be performed as step (5) of the present invention. The heat setting may be performed through a conventional method, and preferably, it may be performed at 180 to 200° C. for 0.1 to 3 minutes by using an IR heater.

Meanwhile, the above-described reflective polarizing film 1000 may further include a structured surface layer on at least one surface. The structured surface layer serves to control the direction of light that is incident or emitted through the reflective polarizing film 1000. The structured surface layer may be employed without limitation in the case of a known configuration having a structured surface known to have a function of controlling the direction of light, and for example, it may have a shape in which the cross-section is lenticular, micro-lens or prism or it is appropriately modified. Alternatively, the structured surface may be irregular unevenness that is generated due to the protrusion of diffusion particles provided in the binder resin. Meanwhile, when the diffusing particles are included, since the direction of light can be controlled through the diffusing particles, unevenness due to the protrusion of the diffusing particles does not necessarily have to be accompanied.

The structured surface layer may be provided on the top and/or bottom of the reflective polarizing film 1000 via the skin layers 211, 212 in the reflective polarizing film 1000 or may be provided the top and/or bottom of the core layer 100 in which the skin layers 211, 212 are omitted, and in this case, it may be integrated by interposing a separate adhesive layer or integrated without an adhesive layer.

The reflective polarizing film satisfying the physical properties according to the present invention as described above may be employed to improve light efficiency by being employed in a light source assembly or a liquid crystal display including the same. Light source assemblies are classified into direct light source assemblies with lamps located at the bottom, edge-type light source assemblies with lamps located on the sides and the like, and the reflective polarizing film according to embodiments of the present invention may be employed in any type of light source assembly. In addition, it is applicable to a back light assembly disposed below the liquid crystal panel or a front light assembly disposed above the liquid crystal panel. Hereinafter, as an example of various application examples, a case in which the reflective polarizing film is applied to a liquid crystal display device including an edge-type light source assembly will be illustrated.

Figure 7A:
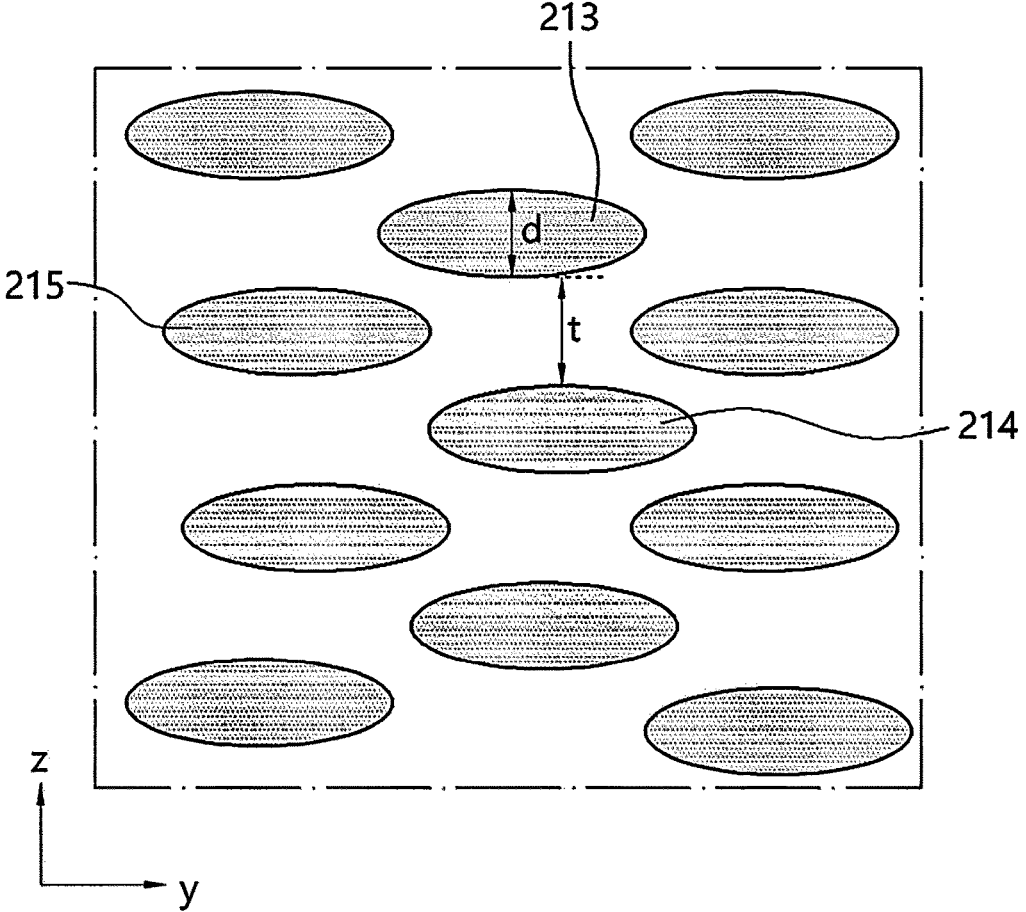
Figure 7B:
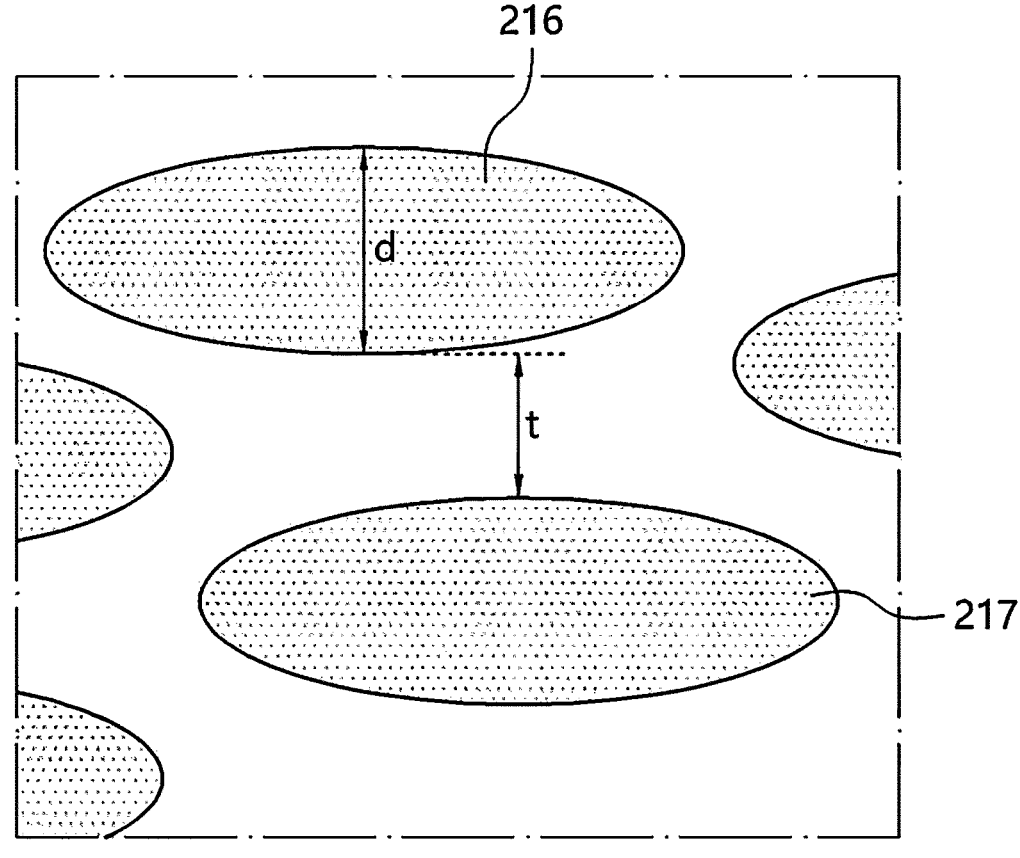
Figure 7C:
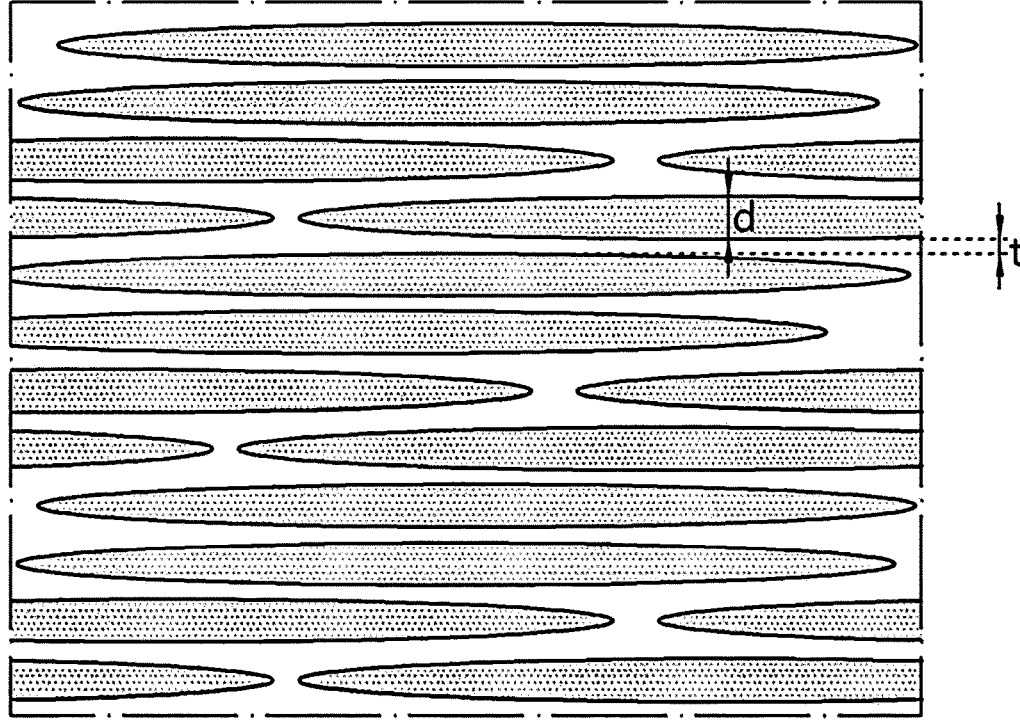

FIG. 7 is a cross-sectional diagram of a liquid crystal display device according to a preferred embodiment of the present invention, wherein the liquid crystal display device 2700 includes a backlight unit 2400 and a liquid crystal panel assembly 2500.

The backlight unit 2400 includes a reflective polarizing film 2111 that modulates the optical characteristics of emitted light, and in this case, since the functions and types of other known configurations included in the backlight unit and the positional relationship between the other configurations and the reflective polarizing film 2111 may vary depending on the purpose, the present invention does not particularly limit the same.

However, according to a preferred embodiment of the present invention, as shown in FIG. 7, it may be configured and arranged by a light source 2410, a light guide plate 2415 for guiding the light emitted from the light source 2410, a reflective film 2320 which is disposed below the light guide plate 2415, and a reflective polarizing film 2111 which is disposed above the light guide plate 2415.

In this case, the light source 2410 is disposed on both sides of the light guide plate 2415. For the light source 2410, for example, a light emitting diode (LED), a cold-cathode fluorescent lamp (CCFL), a hot cathode fluorescent lamp (HCFL), an external electrode fluorescent lamp (EEFL) or the like may be used. In another embodiment exemplary, the light source 2410 may be disposed on only one side of the light guide plate 2415.

While the light guide plate 2415 moves the light emitted from the light source 2410 through total internal reflection, it emits the light upward through a scattering pattern formed on the lower surface of the light guide plate 2415. A reflective film 2420 is disposed under the light guide plate 2415 to reflect light emitted downward from the light guide plate 2415 upward.

A reflective polarizing film 2111 is disposed above the light guide plate 2415. Since the reflective polarizing film 2111 has been described in detail above, the redundant description thereof will be omitted. Other optical sheets may be further disposed above or below the reflective polarizing film 2111. For example, an optical film which is capable of controlling the direction of light, such as condensing or diffusing light, or a retardation film and/or protective film for changing the phase of light may be further installed. In this case, the optical film for controlling the direction of light will be effective when the reflective polarizing film does not separately include a structured surface layer as described above.

In addition, the light source 2410, the light guide plate 2415, the reflective film 2420 and the reflective polarizing film 2111 may be accommodated by a bottom chassis 2440.

The liquid crystal panel assembly 2500 includes a first display panel 2511, a second display panel 2512 and a liquid crystal layer (not illustrated) interposed therebetween, and may further include a polarizing plate (not illustrated) which is attached to the surfaces of the first display panel 2511 and the second display panel 2512, respectively.

The liquid crystal display device 2700 may further include a top chassis 2600 for covering an edge of the liquid crystal panel assembly 2500 and surrounding sides of the liquid crystal panel assembly 2500 and the backlight unit 2400.

Figure 8:
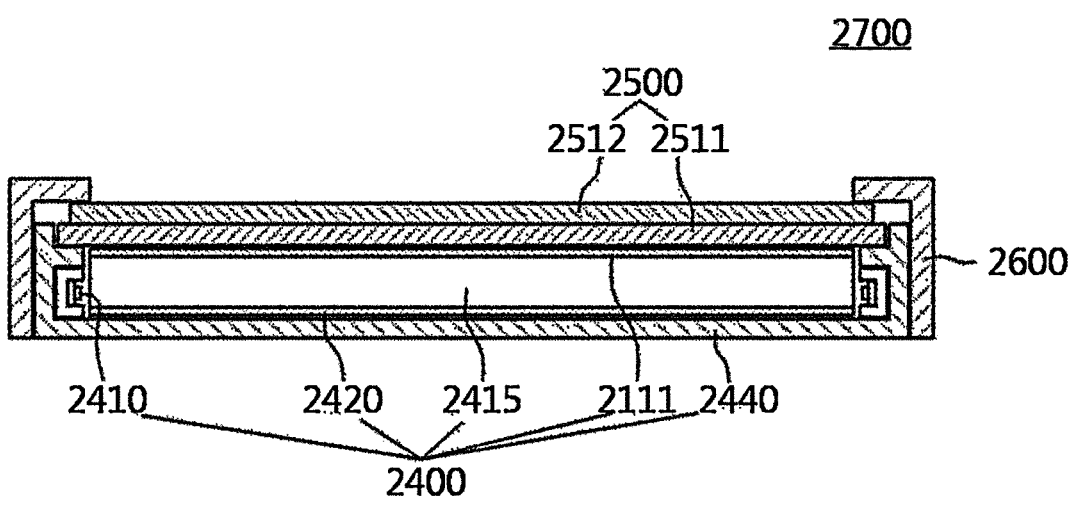
FIG. 8 is a cross-sectional diagram of a liquid crystal display according to an exemplary embodiment of the present invention.
Figure 9:
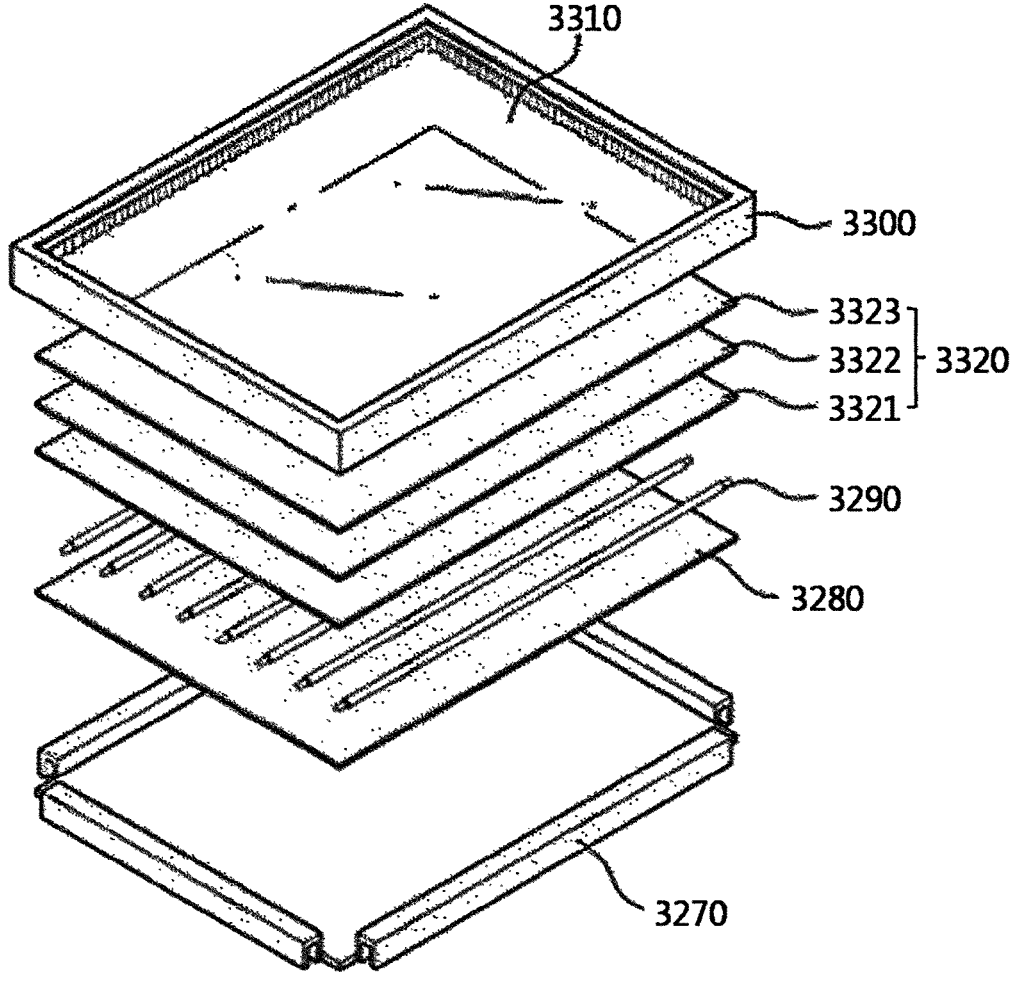
FIG. 9 is an exploded perspective diagram of a liquid crystal display according to an exemplary embodiment of the present invention.

Meanwhile, specifically, FIG. 8 is an example of a liquid crystal display device employing a reflective polarizing film according to a preferred embodiment of the present invention, wherein a reflector 3280 is inserted on a frame 3270, and a cold-cathode fluorescent lamp 3290 is located on the upper surface of the reflector 3280. An optical film 3320 is located on the upper surface of the cold-cathode fluorescent lamp 3290, and although the optical film 3320 may be stacked in the order of a diffusion plate 3321, a reflective polarizing film 3322 and an absorption polarizing film 3323, but the configurations included in the optical film and the stacking order of each configuration may vary depending on the purpose, and some components may be omitted or provided in plurality, and other types of optical films that control light not listed above may be further provided. Meanwhile, a liquid crystal display panel 3310 may be positioned on the upper surface of the optical film 3320 by being inserted into a mold frame 3300.

Looking at the path of light as the center, the light irradiated from the cold-cathode fluorescent lamp 3290 reaches the diffusion plate 3321 of the optical film 3320. The light transmitted through the diffusion plate 3321 passes through the reflective polarizing film 3322 in order to direct the propagate direction of the light perpendicularly with respect to the optical film 3320, thereby causing light modulation. Specifically, P-polarized light transmits through the reflective polarizer without loss, but in the case of S-polarized light, light modulation (reflection, scattering, refraction, etc.) occurs such that it is reflected again by the reflector 3280, which is the back side of the cold-cathode fluorescent lamp 3290. After the nature of the light is randomly changed to P-polarized light or S-polarized light, it passes through the reflective polarizing film 3322 again. After passing through the absorption polarizing film 3323, it reaches the liquid crystal display panel 3310. Meanwhile, the cold-cathode fluorescent lamp 3290 may be replaced with other optical devices such as LEDs.

Meanwhile, in the present invention, the use of the reflective polarizing film has been described mainly for liquid crystal displays, but the present invention is not limited thereto, and it may be widely used in flat panel display technologies such as projection displays, plasma displays, field emission displays and electroluminescent displays, but the present invention is not restricted thereto, and it can be widely applied to glass windows, work lighting that requires polarization and the like.

EXAMPLES

The present invention will be described in more detail through the following examples, but the following examples are not intended to limit the scope of the present invention, which should be interpreted to aid understanding of the present invention.

Example 1

First of all, a dispersion component, a matrix component and a skin layer component were extruded by using a single compressor. Specifically, polyethylene naphthalate (PEN) with a refractive index of 1.65 as the dispersion component and polycarbonate alloy with a refractive index of 1.58 as the matrix component (including 38 wt. % of polycyclohexylene dimethylene terephthalate (PCTG) in which terephthalate, ethylene glycol and cyclohexanedimethanol were polymerized at a 1:2 molar ratio, 60 wt. % of polycarbonate and 2 wt. % of a heat stabilizer including phosphate) were primarily dispersed and introduced into a first extrusion unit, and a raw material including the same ingredient as the matrix component was introduced into a second extrusion unit as the skin layer component, and the second extrusion unit was manufactured by using a flow path generator such that the skin layer covered the upper and lower parts of the matrix with the same thickness.

The extrusion temperature of the matrix component and the dispersion component was set to 245° C., and after confirming the Cap. rheometer, the polymer flow was corrected such that the I.V. difference between the two components was 0.013, and the dispersion component was induced to be randomly dispersed inside the matrix component by passing through a flow path to which the Filtration Mixer was applied, and afterwards, the skin layer component was laminated on both surfaces of the matrix component. Thereafter, spreading was induced in the coat hanger die for compensating for the flow rate and pressure gradient.

Specifically, the width of the die entrance was 200 mm and the thickness was 10 mm, the width of the die exit was 1,260 mm, the thickness was 0.80 mm, and the flow rate was 1.0 m/min. Afterwards, the main cooling was controlled to prevent deformation of the dispersion at 20° C., and cooling air at 18° C. was supplied through an air-blower in order to provide a cooling effect on the opposite surface that did not come into contact with the cooling roll. In order to prevent problems such as breakage due to thickness deviation, a smoothing process was performed such that it was stretched 6 times in the MD direction.

Subsequently, heat setting was performed through a heater chamber at 180° C. for 2 minutes such that the matrix thickness did not exceed 25 μm by combining the skin layers and the total thickness including the core layer did not exceed 125 μm, and thus, a reflective polarizing film as shown in Table 1 below in which the polymer dispersion having the cross-sectional structure as shown in FIG. 2 had a core layer which was randomly dispersed within the matrix.

In this case, the refractive indices of the dispersion component in the manufactured reflective polarizing film were (nx: 1.88, ny: 1.58, nz: 1.58), and the refractive index of the matrix component was 1.58.

Example 2

It was manufactured in the same manner as in Example 1, except that after T-DIE extrusion of the uniformly dispersed matrix-forming component and polymer dispersion component in a single extruder, the temperature of the main cooling roll was changed to 38° C., and while the air-blower was not used, a reflective polarizing film was manufactured.

Example 3

It was manufactured in the same manner as in Example 1, except that it was changed to a Co-rotation twin (coaxial twin) extruder with high shear stress to manufacture a reflective polarizing film.

Example 4

It was manufactured in the same manner as in Example 1, except that it was extruded by lowering the screw rotation speed of the single extruder by 30% to lower the shear stress, and when cooling after T-DIE extrusion, the temperature of the main cooling roll was changed to 34° C., and while the air-blower was not used, a reflective polarizing film was manufactured.

Example 5

It was manufactured in the same manner as in Example 3, except that the number of screw rotations was increased by 1.5 times that of Example 3 in order to increase the shear stress, and the temperature of the main cooling roll was set to 16° C. during cooling after T-DIE extrusion to manufacture a reflective polarizing film.

Example 6

It was manufactured in the same manner as in Example 4, except that the main cooling roll temperature was changed to 20° C., and a reflective polarizing film was manufactured by using an air-blower.

Example 7

It was manufactured in the same manner as in Example 1, except that the core layer thickness was changed to 120 μm while the overall thickness was the same, and the reflective polarizing film was manufactured by changing the main cooling roll temperature to 15° C. during cooling.

Comparative Example 1

It was manufactured in the same manner as in Example 1, except that the polymer which was uniformly dispersed in the extruder was extruded by T-DIE, and during cooling, the temperature of the main cooling roll was set to 82° C., and a reflective polarizing film was manufactured without using an air-blower.

Comparative Example 2

It was manufactured in the same manner as in Example 1, except that the temperature of the main cooling roll was set to 100° C. when the polymer which was uniformly dispersed in the extruder was extruded by T-DIE and cooled, and a reflective polarizing film was manufactured without using an air-blower.

Experimental Example 1

The following physical properties were measured for the reflective polarizing films manufactured in the examples and comparative examples, and the results are shown in Tables 1 and 2 below.
1. Haze
A haze and permeability meter (manufactured by Nippon Denshoku Kogyo Co.) were used to measure haze by using analysis equipment.
2. Thickness of Polymer Dispersions
When the stretching direction of the optical films of the examples was set to the x-axis and the thickness direction was set to the z-axis, after it was vertically cut such that the y-z plane became a cut plane, SEM images were photographed for the cut plane. In this case, SEM images were photographed for each of 5 regions demarcated at equal intervals in the thickness direction of the core layer, and the thicknesses of the polymer dispersions located in region I which was the uppermost region (A) corresponding to both sides of the 5 regions, and region II which was the center region (C) were measured. Specifically, for each SEM image photographed, the thicknesses of the polymer dispersions and the spacing between the polymer dispersions located within a 5 μm×5 μm area were measured, and the average value was calculated and shown. Meanwhile, the spacing (t) between polymer dispersions refers to the shortest distance between adjacent polymer dispersions whose widths overlap by more than 50% when projecting the polymer dispersions in two dimensions in the z-axis direction, and for example, in the case of FIG. 7a, polymer dispersion A 218 and polymer dispersion B 218' correspond to adjacent polymer dispersions, and since polymer dispersion C 218" did not overlap by 50% or more in width when projected onto either polymer dispersion A 218 or polymer dispersion B 218', it does not correspond to an adjacent polymer dispersion, and based on these 3 polymers, these were excluded when calculating the spacing between polymer dispersions. Additionally, in the case of FIG. 7b, the spacing between polymer dispersions is calculated between adjacent polymer dispersions D 219 and polymer dispersions E 219'.
3. Area Percentages of Polymer Dispersions
In the SEM images photographed by area, the area percentages of the polymer dispersions were calculated by using Image-J, which is an open program on the Internet, based on the SEM images that had been corrected for contrast and magnification such that the boundary between the polymer dispersion and the matrix became clear.
4. Relative Luminance
In order to measure the luminance of the reflective polarizing film, it was performed as follows. After manufacturing a test display in which the panel was assembled on a 32" edge-type backlight in which a reflective film, a light guide plate, a diffusion plate, a reflective polarizing film and an absorption-type polarizing film were provided in sequence, the luminance at 9 points on the panel were measured by using Topcon's BM-7 meter, and the average value was calculated. In addition, based on the luminance of Example 1 as 100, the luminance of the remaining examples and comparative examples was relatively shown.
5. Degree of Polarization
The degree of polarization was measured at λ=550 nm and λ=650 nm by using OTSKA's RETS-100 analysis equipment.

TABLE 1

| | | Example 1 | Example 2 | Example 3 | Example 4 | Example 5 | Example 6 | Example 7 |
|---|---|---|---|---|---|---|---|---|
| Type of extruder | | Single | Single | Coaxial Twin | Single | Coaxial Twin | Single | Single |
| Temperature of main cooling roll (° C.) | | 18 | 38 | 20 | 34 | 16 | 20 | 15 |
| Whether air blower is used | | Used | Not used | Used | Not used | Used | Used | Used |
| Reflective polarizing film | Total thickness (μm) | 125 | 125 | 125 | 125 | 125 | 125 | 125 |
| | Thickness of core layer (μm) | 110 | 108 | 103 | 104 | 103 | 105 | 120 |
| | Thickness of skin layer (μm) | 15 | 17 | 22 | 21 | 22 | 20 | 5 |
| Haze (%) | | 18.0 | 28.7 | 17.6 | 21.0 | 19.4 | 20.5 | 22.1 |
| Transmittance (%) | | 51.5 | 51.5 | 52.5 | 53.6 | 52.0 | 52.9 | 51.8 |
| Region I | Average thickness of dispersions (nm, $d_f$) | 62.0 | 65.0 | 59.6 | 74.0 | 35.0 | 71.2 | 48.1 |
| | Average spacing between adjacent dispersions (nm) | 59.0 | 68.0 | 55.8 | 67.0 | 31.0 | 66.9 | 45.6 |
| | Percentage of polymer dispersion area (%) | 47.0 | 46.0 | 46.7 | 47.9 | 45.7 | 46.7 | 43.0 |

TABLE 1-continued

| | | Example 1 | Example 2 | Example 3 | Example 4 | Example 5 | Example 6 | Example 7 |
|---|---|---|---|---|---|---|---|---|
| Region II | Average thickness of dispersions (nm, $d_{II}$) | 69.0 | 122.0 | 52.7 | 82.4 | 39.6 | 77.4 | 78.4 |
| | Average spacing between adjacent dispersions (nm) | 64.0 | 100.4 | 48.7 | 77.6 | 38.6 | 74.6 | 73.5 |
| | Percentage of polymer dispersion area (%) | 48.0 | 46.4 | 47.8 | 47.5 | 46.7 | 47.1 | 53.0 |
| Difference in percent area of polymer dispersions in region II and region I (%) (absolute value) | | 1.0 | 0.4 | 1.1 | 0.4 | 1.0 | 0.4 | 10.0 |
| Average thickness ratio between dispersions located in region II and region I ($d_{II}/d_I$) | | 1.1 | 1.9 | 0.9 | 1.1 | 1.1 | 1.1 | 1.6 |
| Degree of polarization | | 87.0 | 80.5 | 84.8 | 84.0 | 83.6 | 85.9 | 82.9 |
| Relative luminance (front, %) | | 100.0 | 92.4 | 95.8 | 94.0 | 92.1 | 94.8 | 93.1 |

20

TABLE 2

| | | Comparative Example 1 | Comparative Example 2 |
|---|---|---|---|
| | Type of extruder | Single | Single |
| | Temperature of main cooling roll (° C.) | 82 | 100 |
| | Whether air blower is used | Not used | Not used |
| Reflective polarizing film | Total thickness (μm) | 125 | 125 |
| | Thickness of core layer (μm) | 104 | 103 |
| | Thickness of skin layer (μm) | 21 | 22 |
| | Haze (%) | 31.4 | 29.5 |
| | Transmittance (%) | 53.7 | 54.3 |
| Region I | Average thickness of dispersions (nm, $d_I$) | 66.5 | 68.5 |
| | Average spacing between adjacent dispersions (nm) | 68.0 | 67.4 |
| | Percentage of polymer dispersion area (%) | 45.5 | 45.0 |
| Region II | Average thickness of dispersions (nm, $d_{II}$) | 73.2 | 41.3 |
| | Average spacing between adjacent dispersions (nm) | 17.4 | 12.1 |
| | Percentage of polymer dispersion area (%) | 57.5 | 68.9 |
| Difference in percent area of polymer dispersions in region II and region I (%) (absolute value) | | 12.0 | 23.9 |
| Average thickness ratio between dispersions located in region II and region I ($d_{II}/d_I$) | | 1.1 | 0.6 |
| | Degree of polarization | 74.6 | 72.0 |
| | Relative luminance (front, %) | 86.8 | 85.0 |

As can be seen through Tables 1 and 2 and FIGS. 6a to 6c, it can be confirmed that the reflective polarizing films according to the examples have excellent degrees of polarization and luminance compared to the reflective polarizing films according to the comparative example.

Specifically, compared to Examples 1 and 2, Comparative Example 1 and Comparative Example 2 had significantly decreased polarization and luminance, and these were due to insufficient cooling of the central part of the core layer, and accordingly, bonding occurred between the polymer dispersion-forming components located in the central area of the cross section of the core layer, and the matrix forming-component which was arranged to be adjacent to the polymer dispersion changed into a third material such that it was expected that this was due to matrix destruction where the polymer dispersion-matrix interface was not properly formed. In addition, it can be seen that the value of the percentage difference (%) (absolute value) of the polymer dispersion areas in region II and region I was reflected as a result exceeding 10% in the comparative examples.

Although one exemplary embodiment of the present invention has been described above, the spirit of the present invention is not limited to the exemplary embodiments presented in the present specification, and those skilled in the art who understand the spirit of the present invention may easily suggest other exemplary embodiments by changing, modifying, deleting or adding components within the scope of the same spirit, but this will also fall within the scope of the present invention.

The invention claimed is:

1. A reflective polarizing film, comprising:

a matrix; and a core layer including a plurality of polymer dispersions that are randomly arranged in the matrix in the y-axis and z-axis directions while the x-axis direction is the longitudinal direction among the x-axis, y-axis, and z-axis that are perpendicular to one another, wherein when a plane of the core layer taken along a y-z plane is demarcated into 5 regions with the same thickness in the z-axis direction, the difference between a polymer dispersion area percentage in the uppermost or the lowermost region and a polymer dispersion area percentage in the center region among the 5 regions is 10% or less.

2. The reflective polarizing film of claim 1, wherein the matrix and the polymer dispersion have a difference in refractive index in the y-axis and z-axis directions of 0.05 or less, and a difference in refractive index in the x-axis direction of 0.1 or more.

3. The reflective polarizing film of claim 1, wherein the plurality of polymer dispersions have an average thickness of 50 nm or more on a plane of the core layer taken along the y-z plane.

4. The reflective polarizing film of claim 1, wherein the polymer dispersion located in the center region has an average thickness of 110 nm or less.

5. The reflective polarizing film of claim 1, wherein the average thickness ratio ($d_{II}/d_I$) between the average thickness ($d_I$) of the polymer dispersion included in the uppermost region or the lowermost region and the average thickness ($d_{II}$) of the polymer dispersion included in the center region is 0.8 to 1.6.

6. The reflective polarizing film of claim 1, wherein the percentage of the polymer dispersion area in the total area of the matrix and polymer dispersion in the uppermost region or the lowermost region and the percentage of the polymer dispersion area in the total area of the matrix and polymer dispersion in the center region are each independently 40 to 55%.

7. The reflective polarizing film of claim 1, wherein the reflective polarizing film has a haze of 30% or less, and the core layer has a thickness of 150 μm or less.

8. The reflective polarizing film of claim 1, further comprising:

a skin layer which is formed integrally with at least one surface of the core layer.

9. A light source assembly, comprising the reflective polarizing film according to claim 1.

10. A liquid display device, comprising:

a light source unit which is the light source assembly according to claim 9; and a display unit including a liquid crystal cell which is disposed on a light-emitting surface of the light source unit.

* * * * *